United States Patent [19]
Komatsu

[11] Patent Number: 5,362,954
[45] Date of Patent: Nov. 8, 1994

[54] DATA TRANSFER METHOD FOR USE IN SEMICONDUCTOR DATA RECORDING MEDIUM

[75] Inventor: Eiichi Komatsu, Tokyo, Japan

[73] Assignee: Dai Nippon Printing Co., Ltd., Tokyo, Japan

[21] Appl. No.: 975,434

[22] Filed: Nov. 12, 1992

[30] Foreign Application Priority Data

Nov. 12, 1991 [JP]  Japan ................... 3-323716
Nov. 12, 1991 [JP]  Japan ................... 3-323717
Nov. 12, 1991 [JP]  Japan ................... 3-323718
Nov. 12, 1991 [JP]  Japan ................... 3-323719

[51] Int. Cl.$^5$ .......................................... G06K 19/06
[52] U.S. Cl. ................................. 235/492; 235/380
[58] Field of Search ........................ 295/380, 492

[56]  References Cited
FOREIGN PATENT DOCUMENTS 0147099   7/1985  European Pat. Off. .
0461878  12/1991  European Pat. Off. .
8810433  12/1988  WIPO .
8901208   2/1989  WIPO .

Primary Examiner—Harold Pitts
Attorney, Agent, or Firm—Ladas & Parry

[57] ABSTRACT

Concurrent two-way data transfer can be conducted with higher reliability and improved accuracy with an IC card and a reader/writer device kept out of physical contact with each other. A first signal wave is produced by the reader/writer device to transmit first bit information. This first signal wave has trigger pulses at a period T (at the start of a period T), and bit pulses behind the associated trigger pulses by a time interval t1+d. The bit information is represented by the presence and absence of bit pulse, and the presence of a bit pulse is "1", the absence of a bit pulse being "0". The IC card produces a second signal wave to transmit second bit information. The second signal wave is entrained on a set carrier which is transmitted to the IC card through coils. The IC card changes an input impedance of the receiving coil, based on the second signal wave. Resultantly a modulated wave is transmitted between the coils.

5 Claims, 9 Drawing Sheets

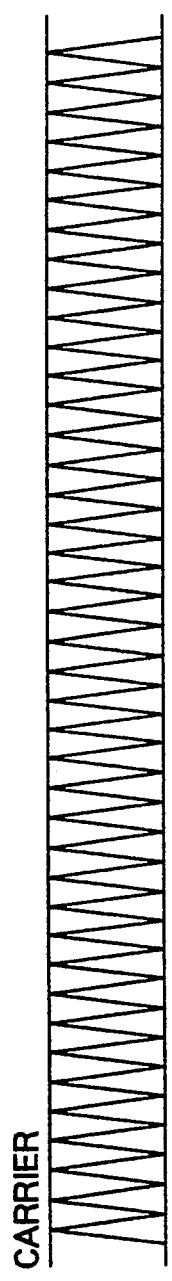
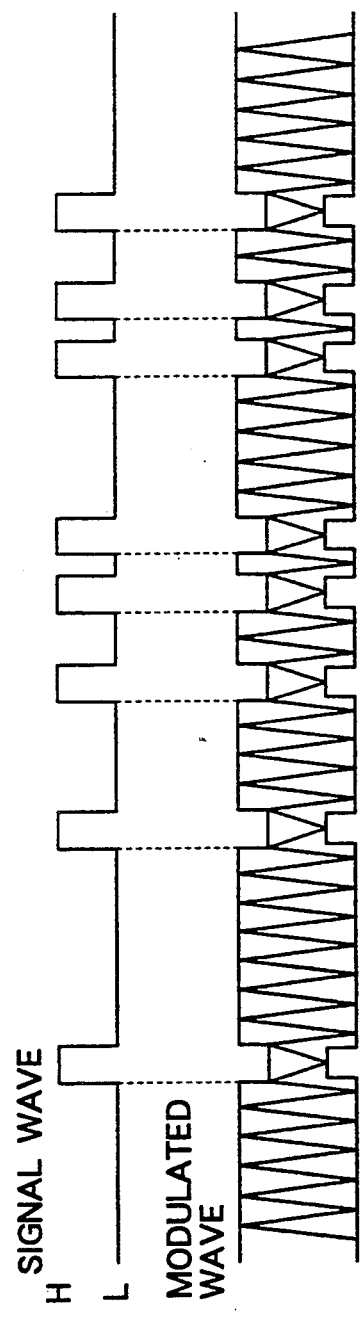
FIG. 2(a)  FIG. 2(b)  FIG. 2(c)

FIRST SIGNAL WAVE

SECOND SIGNAL WAVE

FIG. 9(a) FIRST BIT INFORMATION
FIG. 9(b) FIRST SIGNAL WAVE
FIG. 9(c) MODULATED WAVE

DATA TRANSFER METHOD FOR USE IN SEMICONDUCTOR DATA RECORDING MEDIUM

BACKGROUND OF THE INVENTION

This invention relates to a data transfer method for use in a semiconductor data recording medium, specifically a data transfer method suitable to transfer data between an IC card and a reader/writer device without physical contact therebetween.

Recently IC cards have been noted as a new data recording medium. IC cards are a card-shaped recording medium which is convenient to be carried with, while they contain semiconductor recording devices built in and can store very large volumes of data in comparison with magnetic cards. The IC cards having a built-in CPU are very useful in applications requiring high security because of the arithmetic processing function they own.

Reader/writer devices are used to write and read data in and from semiconductor data recording mediums such as the above-described IC cards, and so on. The input/output terminals of the reader/writer devices are electrically contacted to the input/output terminals of the IC cards, whereby electric power and a clock can be supplied from the reader/writer devices to the IC cards, and data transfer is possible between them. Recently a new method for transferring data between them without any physical contact with each other has been proposed. That is, a reader/writer device and an IC card are magnetically coupled to each other by means of a first coil of the former and a second coil of the latter, whereby an electric power and a clock are supplied, and data transfer are conducted. Such non contact data transfer dispenses with external input/output terminals, which makes IC cards more portable.

But the data transfer method used in the above-described conventional semiconductor data recording medium has a problem that accurate data transfer cannot be conducted. Generally noncontact data transfer is very disadvantageous in conducting accurate data transfer in comparison with the data transfer in secured electric contact. That is, in order to conduct noncontact data transfer, a carrier is modulated in accordance with a data signal, then the modulated wave is transmitted from a first coil to a second coil by the electromagnetic induction, and then the modulated wave is demodulated to extract the data signal. Resultantly the demodulated data signal has a considerably rounded waveform, and it is more possible that the so-called bit falls occur. In addition, external noises tend to mix in. Accordingly to make highly reliable data transfer it is necessary to conduct sufficient error detecting process and others. Furthermore, to make two-way data transmission, in the conventional method two coils, a transmission coil and a receiving coil, have to be provided on each of the reader/writer device and the semiconductor data recording medium. But the semiconductor data recording medium, such as IC cards, must make use of a characteristic of being a small-sized device which is conveniently portable. It is difficult for the IC card to include a couple of coils for efficient magnetic coupling.

Another problem of the conventional noncontact data transfer is that the data transfer from the reader/writer device to the semiconductor data recording medium, and that from the latter to the former cannot be concurrently made. Consequently it is necessary that a period of transfer time is time-divided to make a transfer alternately to one way and to the other way in such a manner that when a transfer to one way is over, that to the other way is conducted. Consequently no quick response cannot be made between both in terms of data transfer.

In the system in which noncontact data transfer is conducted, particular reset means is needed. That is, when the IC card is reset on the side of the reader/writer device, some external reset command has to be transferred to the IC card. In a contact data transfer system a special reset line is provided between the two, and an external reset command signal can be transmitted through the reset line. But in the noncontact data transfer system, data transmission channel has to be formed between the two by the magnetic coupling between the two coils. Consequently to form a special reset channel between the two, an additional coil has to be provided to form an additional magnetic coupling. But unpreferably the provision of an additional coil hinders the miniaturization of the IC card.

In the conventional noncontact data transfer system, reset is conducted by temporarily discontinuing a power supply to the IC card. That is, the IC card is reset by re-actuating the data transfer system. But a problem of this method of resuming an electric supply following a pause thereof is that the system takes time to have its stable state.

SUMMARY OF THE INVENTION

A first object of this invention is to provide a noncontact data transfer method for use in a semiconductor data recording medium, which can make highly reliable and accurate data transfer. A second object of this invention is to provide a noncontact data transfer method which can make highly reliable and accurate concurrent two-way data transfer. A third object of this invention is to provide a reset method which can reset a semiconductor data recording medium without interrupting a power supply. A fourth object of this invention is to provide a noncontact data transfer method for use in a semiconductor data recording medium, which can efficiently make two-way data transmission through coils.

This invention provides a noncontact data transfer method for transferring data between a semiconductor data recording medium and a reader/writer device for writing and reading data in and from the semiconductor data recording medium. In this method, the reader/writer device superimposes a signal wave on a carrier to generate a modulated wave and supplies the modulated wave to a first coil. The semiconductor data recording medium receives the modulated wave by a second coil, and demodulates the received modulated wave to detect the signal wave, thus data transfer being conducted with the semiconductor data recording medium and the reader/writer device kept out of physical contact with each other. The signal wave comprises trigger information provided at a set period T, first bit information provided behind the associated trigger information by a set time interval t1 (t1<T), and second bit information provided behind the associated trigger information by a set time interval t2 (t2<T), and data transfer from the reader/writer device to the semiconductor recording medium being conducted based on the first bit information, and data transfer from the semiconductor recording medium to the reader/writer device being conducted based on the second bit information.

In the conventional general data transfer method, information to be transferred is represented in a sequence of bit information, and this sequence of bit information is entrained on a carrier to be transferred. In the data transfer method according to this invention, bit information are entrained on a carrier together with trigger information. That is, there is prepared a signal wave which is recurrences of a form at a period T, in which trigger information is followed by first bit information and second bit information. And this signal wave is entrained on a carrier and transferred. An interval between the trigger information and the following first bit information is set at a certain time interval t1, and an interval between the trigger information and the following second bit information is set at a certain time interval t2. Consequently even in a case that a signal wave after demodulation is rounded, its bit information can be detected without failure by following the process that trigger information is first detected, and then bit information which is at a position behind the trigger information by a time interval t1 is detected. During one period T both the first bit information and the second bit information can be transferred. Consequently data transfer can be conducted concurrently in two-ways.

In the above-described data transfer method according to this invention, to reset the semiconductor data recording medium, an external reset command is to be supplied to the semiconductor data recording medium from the reader/writer device. This external reset command is transmitted by inserting no pulse into a signal wave for a set period. To achieve this resetting method, the semiconductor data recording medium according to this invention comprises pulse detecting means for detecting pulses from a signal wave which has been transmitted to the semiconductor data recording medium, and reset means for generating a reset signal, the reset means starting counting time at a time when the pulse detecting means detects a pulse, and generating a reset signal only when a set period of time D (D>T) has passed in which the detecting means detects no pulse.

This resetting method is based on the use of the innovational data transfer method which is a major subject of this invention. In this innovational data transfer method, as described above, trigger pulses are inserted at a set period T in a signal wave transmitted from the reader/writer device to the semiconductor data recording medium, and each trigger pulse is followed by bit pulses. Consequently in the normal data transferring state, some pulse is without missing present at at least every period T. The resetting method of the invention uses this characteristic of the innovational data transfer method. In other words, by inserting no pulse in a signal wave during a period T, it can be made possible to recognize an abnormal data transfer state. This invention uses this state as the external reset command.

When an external reset command is given from the reader/writer device, for example, a trigger pulse is omitted from one period of a signal wave so that a state without any pulse continues for a period of time longer than the period T. When the semiconductor data recording medium detects this state, it recognizes the state as an external reset command. To release the reset, a trigger pulse is again supplied. The reset semiconductor data recording medium detects a new trigger pulse and operates to release the reset.

This invention according to another aspect comprises a noncontact data transfer method for transferring data between a semiconductor data recording medium and a reader/writer device for writing and reading data in and from the semiconductor data recording medium, the met;hod is characterized in that the reader/writer device includes a first transmission coil, and a receiving second coil having a higher sensitivity than the first: coil, and the semiconductor data recording medium includes a third receiving coil, a first signal wave and a second signal wave being prepared, the first signal wave indicating a data to be transmitted to the semiconductor data recording medium, and the second signal wave indicating a data to be transmitted to the reader/writer device, the reader/writer device superimposing the first signal wave on a carrier to produce a modulated wave, and supplying the modulated wave to the first coil to transmit the same, while detecting a load change occurring in the third coil by the second coil to receive the second signal wave, and the semiconductor data recording medium receiving the modulated wave by the third coil and demodulating the received modulated wave to detect the first signal wave, and giving the load change to the third coil based on the second signal wave, whereby data transfer can be conducted in two-ways between the reader/writer device and the semiconductor data recording medium with both kept out of physical contact.

In this data transfer method, two coils, a transmission coil and a receiving coil, are necessary on the reader/writer device, though a single coil for transmission/receiving coil is provided on the semiconductor data recording medium. The transmission coil transmits on a carrier a first signal wave produced in the reader/writer device, and the transmission/receiving coil of the semiconductor data recording medium receives the first signal wave. A second signal wave produced in the semiconductor data recording medium is transmitted to the side of the reader/writer device in the form of a load change occurred in the transmission/receiving coil and detected by the receiving coil of high sensitivity. Thus, by the use of the three coils, two-way data transfer can be efficiently conducted.

BRIEF DESCRIPTION OF THE DRAWINGS

FIGS. 2(a) to 2(c) are waveforms of examples of a carrier, signal wave and modulated wave used in the noncontact data transfer method according to this invention.

DESCRIPTION OF THE PREFERRED EMBODIMENTS

Figure 1:
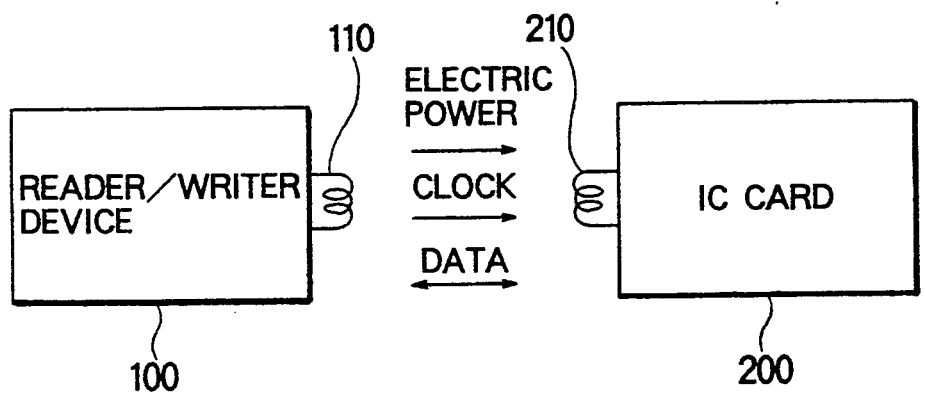
FIG. 1 is a block diagram of a reader/writer device 100 and an IC card 200 to which the noncontact data transfer method according to this invention is applied.

This invention will be explained below by means of embodiments. FIG. 1 is a block diagram of a reader/writer device 100 and an IC card 200 to which the noncontact data transfer method according to this invention is applied. The reader/writer device 100 has a first coil 110, and the IC card 200 has a second coil 210. These coils are electromagnetically coupled to each other, whereby data transfer is conducted between the two coils 110 and 210. To be more specific, an electric power and clocks are supplied from the reader/writer device 100 to the IC card 200, while data signals are supplied to and received by each other between the two coils 110 and 210.

The reader/writer device 100 superimposes a signal wave containing information representing data to be transferred on a carrier of a set frequency and to form a modulated wave, and supplies the modulated wave to the first coil 110 to transmit the same. On the other hand, the IC card 200 receives the modulated wave at the second coil 210, rectifies the received modulated wave and generates a source power, and extracts a component of a set frequency from the received modulated wave to generate clock signals, and demodulates the received modulated wave to detect the signal wave.

FIGS. 2(a) to 2(c) show examples of the above-described carrier, the signal wave and the modulated wave. The carrier is exemplified in FIG. 2(a) by a triangular wave but may be a sine wave or a rectangular wave. The signal wave of FIG. 2(b) is a binary data taking level L or level H. The essence of this invention is a representation of information by binary data. This will be elaborated later. The modulated wave of FIG. 2(c) is the carrier of FIG. 2(a) modulated by the signal wave of FIG. 2(b) and is obtained by superimposing the signal wave on the carrier. The modulated wave of FIG. 2(c) is supplied to the first coil 110 and received by the second coil 210 on the IC card 200.

The principle on which an electric power, clocks and data are transmitted from the reader/writer device 100 to the IC card 200 has been described above. Oppositely from the IC card 200 to the reader/writer device 100 is transmitted only data. The carrier propagates only from the first coil 110 to the second coil 210 and never oppositely propagates. In order to transmit data from the IC card 200 to the reader/writer device 100, on the side of the IC card 200 an impedance of the second coil 210 is changed. For example, a resistance value of a resistor element connected to the second coil 210 is switched to change a load for a current flowing through the first coil 110 electromagnetically coupled to the second coil 210. Resultantly an amplitude of the carrier transmitted from the first coil 110 is changed. Thus a resistance switched state of, the IC card 200 can be transmitted to the reader/writer device 100. This information transmission will be elaborated later.

Figure 3:
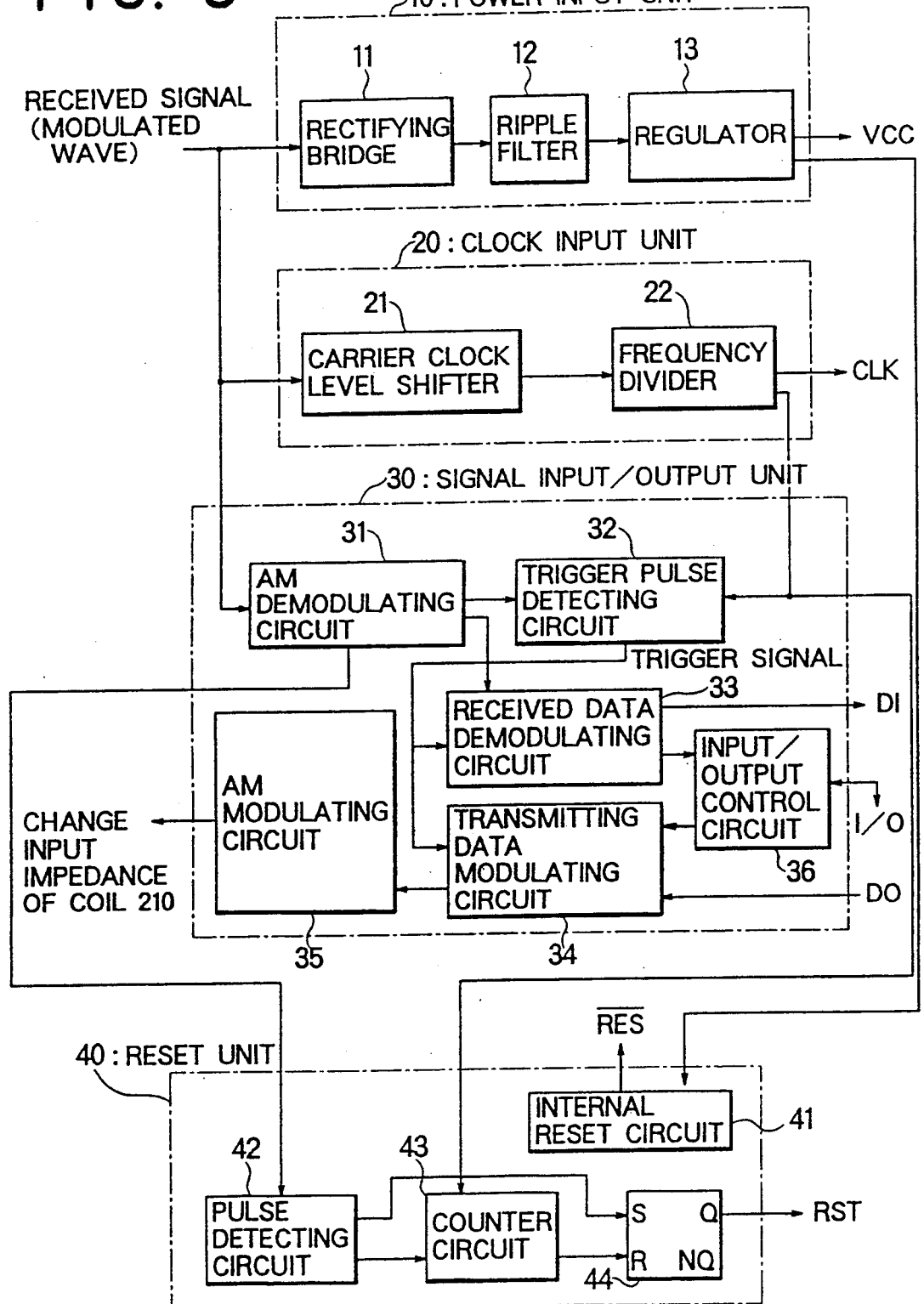
FIG. 3 is a block diagram of an input/output stage of the IC card 200 in FIG. 1.

FIG. 3 is a block diagram of an internal structure of an input/output stage of the IC card 200. This input/output stage comprises four elements, a power input unit 10, a clock input unit 20, a signal input/output unit 30 and a reset unit 40. A received signal at the second coil 210, i.e., a modulated wave, is supplied to these respective elements. The modulated wave supplied to the power input unit 10 is rectified by a rectifying bridge 11, then passed through a ripple filter 12 to be smoothed, and converted into a stable source voltage VCC by a regulator 13. Thus, the power input unit 10 takes out from the received signal a source power necessary to operate the IC card 200. The modulated wave supplied to the clock input unit 20 is supplied to a carrier clock level shifter 21. Here a frequency component of the modulated carrier is extracted and divided by a frequency divider 22 by a set frequency dividing ratio, and a clock signal CLK of a set frequency is produced. Thus the clock input unit 20 takes out from the received signal a clock signal necessary to operate the IC card 200. The modulated wave supplied to the signal input/output unit 30 is demodulated by an AM demodulating circuit 31. That is, a signal wave of FIG. 2(b) is extracted from the modulated wave of FIG. 2(c). This signal wave is supplied to a trigger pulse detecting circuit 32 and a received data demodulating circuit 33. The trigger pulse detecting circuit 32 detects trigger pulses necessary to demodulate a received data and modulate a transmitting data, and informs the received data demodulating circuit 33 and the transmitting data modulating circuit 34 of detection timings. The received data demodulating circuit 33 demodulates the received data, based on the detection timings and takes out as input data DI the information transferred from the reader/writer device 100. On the other hand, the transmitting data modulating circuit 34, to transfer information supplied as an output data DO to the reader/writer device 100, modulates the transmitting data, based on the detection timings of the trigger pulses, and supplies the modulated transmitting data to an AM modulating circuit 35. Based on this transmitting data, the AM modulating circuit 35 operates to change an input impedance of the second coil 210 (e.g., operates to switch the resistor element connected to the coil). The input/output control circuit 36 receives and supplies an input/output control signal I/O from and to a CPU (not shown) to control the above described receiving and transmitting operations. The demodulation of the received data and the modulation of the transmitting data which are characteristic of this invention will be elaborated later. The function of a reset unit 40 will be described later.

Figure 4:
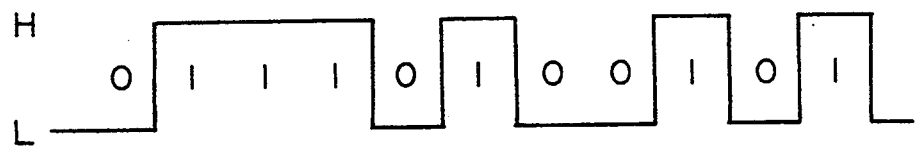
FIG. 4 is a waveform showing contents of a signal wave used in a conventional data transfer method.

The above-described arrangement makes it possible to transfer an electric power, clock and data from the reader/writer device 100 to the IC card 200 and also to transfer data oppositely from the IC card 200 to the reader/writer device 100. Here a representation form of data to be transferred will be discussed. The information to be transferred is transferred in a signal wave represented by binary data as in FIG. 2(b). Conventionally the representation of information for the general binary data is made by defining one of bit states at either of level L and level H. For example, when bit "0" is defined at level L and bit "1" at level H, the binary data of FIG. 4 represents "01110100101". But when the signal wave of FIG. 4 is transmitted on a carrier, there is a possibility that accurate information transmission is impaired. The waveforms of the respective waves of FIGS. 2(a) to 2(b) are theoretical waveforms, and the actual waveforms have distortions and roundings. Especially the modulated waves received by the IC card 200 are considerably rounded. Accordingly even when the signal wave of FIG. 4 is transmitted, a signal wave demodulated by the IC card 200 may not have such beautiful waveform, and there is a possibility that the bit information cannot be accurately demodulated.

Figure 5:
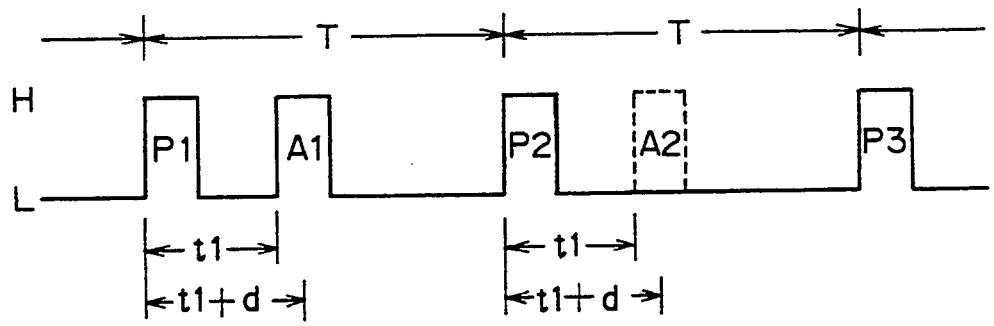
FIG. 5 is a waveform showing contents of a first signal wave containing information to be transmitted to the IC card in the transfer method according to this invention.

A characteristic of the data transfer method according to this invention is to provide a representation form of data which enables highly reliable and accurate data transfer in such circumstances. As shown in FIG. 5, trigger pulses P1, P2, P3 . . . are supplied at a set period T. Bit information A1, A2 . . . are supplied at positions which are behind positions of the associated trigger pulses by a set time interval t1, (t1<T). In this embodiment, bit information is given by information as to the presence and absence of a bit pulse. To be more specific, a bit is represented by the information that a bit pulse is present or absent at a set position. In FIG. 5, for example, bit information A1 indicates bit "1" since a bit pulse is present at a position behind the trigger pulse P1 by the set time interval t1, and bit information A2 indicates bit "0" since a bit pulse is absent at a position behind the trigger pulse P2 by the set time interval t1. Thus, the trigger pulses P1, P2, P3 , . . . appear at a period T without missing, but the bit pulses A1, A2, A3 , . . . appear or do not appear behind the associated trigger pulses by the time interval t1. The trigger pulses and the bit pulses are quite the same pulses in terms of pulse waveforms and are discriminated from each other only by their positions.

Thus, according to the method of this invention, one bit representing the information to be transferred appears at a period T. By presetting a period T of trigger pulses, and a time interval t1 by which bit information is delayed from its associated trigger pulse, the information can be taken out by one bit. That is, the receiving side first detects a trigger pulses P1, P2, P3 , . . . , and then based on the trigger pulse, a bit pulse is detected. Specifically it is detected whether a bit pulse rises or not at the time interval t1 from a time when a trigger pulse P1, P2, P3 , . . . has risen. Actually, however, it is preferable that an allowance d (e.g., a half of a width of a bit pulse) is added to the time interval t1 to set a time interval at t1+d, and it is detected at a t1+d time interval whether a signal wave is on level H or level L. When the signal wave is on level H, bit "1" is detected, and bit "0" is detected when the signal wave is on level L.

Another characteristic of the data transfer method according to this invention is that data can be concurrently transferred in two-ways between the reader/writer device 100 and the IC card 200. In the conventional data transfer method, two-way data transfer is conducted by time dividing a period of transfer time to transfer data alternately in one way and in the other way. In the method according to this invention, data transfer in two-ways can be concurrently conducted. Since the information transfer channel is only one, strictly speaking, quite concurrent two-way data transfer cannot be, as a matter of course, conducted. In the specification of the present application, concurrent two-way data transfer means that data is transferred in the unit of one bit alternately in two-ways.

Figure 6:
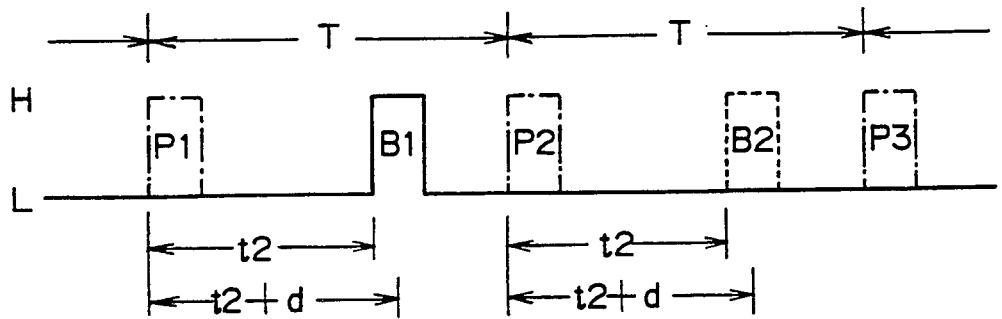
FIG. 6 is a waveform showing contents of a second signal wave containing information to be transmitted to the reader/writer device in the transfer method according to this invention.

Here it is assumed that a first signal wave of FIG. 5 is produced. This signal wave is constituted by trigger pulses P1, P2, P3 , . . . , and bit pulses A1 (A2 is absent), and indicates a binary data of [10] in a period of 2T. Then a second signal wave of FIG. 6 is considered. The second signal wave is constituted by bit pulse B1 (B2 is absent). The first and the second signal waves have the same time axis (horizontal axis), and only the positions of the trigger pulses P1, P2, P3 , . . . of the first signal wave are shown in the one dot chain lines in the second signal wave. In the second signal wave, data is represented in the same form as in the first signal wave. That is, bit information B1, B2, B3 , . . . are positioned behind their associated trigger pulse P1, P2, P3 , . . . by a set time interval t2 (t2<T). For example in FIG. 6, bit information B1 indicates bit "1" since a bit pulse is present at a position behind the trigger pulse P1 by the set time interval t2. Bit information B2 indicates bit "0" since a bit pulse is absent at a position behind the trigger pulse P2 by the set time interval t2. Accordingly this second signal wave indicates binary data of [10] in a period of 2T. To take out the bit information from such signal wave, first on the receiving side the trigger pulses P1, P2, P3 , . . . are detected and, based on the trigger pulses, bit pulses are detected. Specifically it is detected whether or not a bit pulse rises at a time interval t2 from a time when the associated trigger pulse P1, P2, P3 , . . . has risen. Actually, however, it is preferable that an allowance d (e.g., a half of a width of a bit pulse) is added to the time interval t2 to set a time interval at t2+d, and it is detected at a t2+d time interval whether a signal wave is on level H or level L. When the signal wave is on level H, bit "1" is detected, and bit "0" is detected when the signal wave is on level L.

Figure 7:
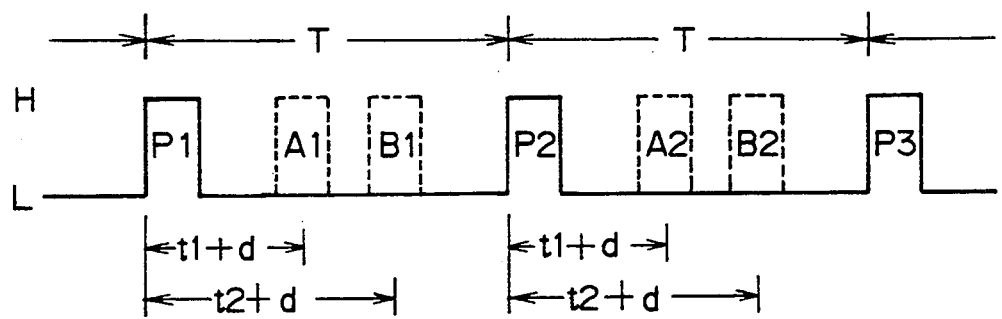
FIG. 7 is a waveform of a multiplexed signal wave of the first signal wave of FIG. 5 and the second signal wave of FIG. 6.

Here it is assumed that the first signal wave of FIG. 5 is produced by the reader/writer device 100, and the second signal wave of FIG. 6 is produced by the IC card 200. In the reader/writer device 100, a carrier is modulated by the first signal wave, and an electric current corresponding to this modulated wave is supplied to the first coil 110, while in the IC card 100, an input impedance of the second coil 210 is changed, based on the produced second signal wave. For example, a value of a resistor element connected to the second coil 210 becomes R1 on level H, and becomes R2 on level L. A change of an input impedance of the second coil 210 changes a load of a current flowing through the first coil 110, and the information of the second signal wave produced in the IC card 200 is superimposed on the modulated wave produced in the reader/writer device 100. Resultantly the multiplexed signal wave of FIG. 7 is entrained on the carrier and is transferred from the reader/writer device 100 to the IC card 200. That is, in a period T following the trigger pulse P1, the data bit information A1 is transmitted from the reader/writer device 100 to the IC card 200, and the data bit information B1 is transmitted from the IC card 200 to the reader/writer device 100. Similarly in a period T following the trigger pulse P2, both bit information A2 and B2 are transmitted. Thus, in the IC card 200, a level of the multiplexed signal wave after t1+d from a time of the detection of a trigger pulse is detected, whereby bits transmitted from the reader/writer device 100 can be recognized. In the reader/writer device 100, a level of a multiplexed signal wave after t2+d from a time of the detection of a trigger pulse is detected, whereby bits transmitted from the IC card 200 can be recognized.

Figure 8:
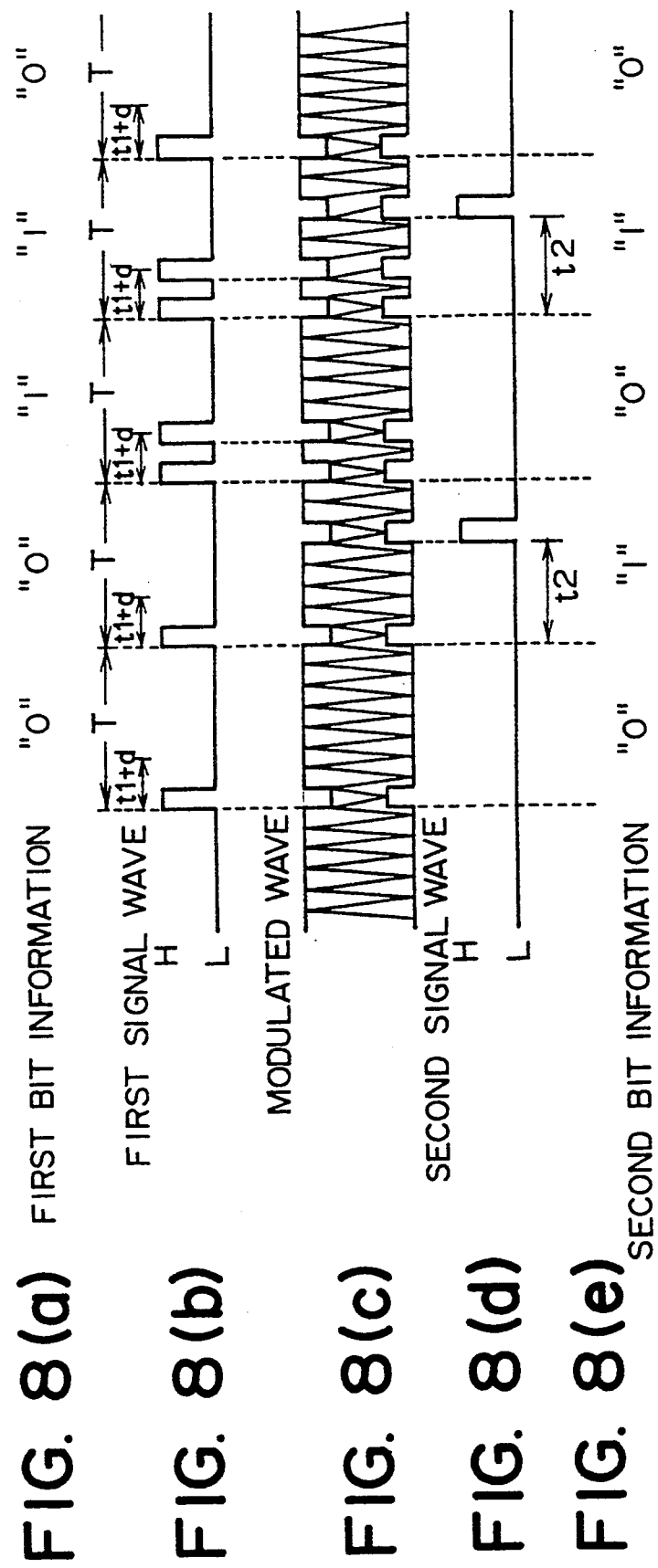
FIGS. 8(a) to 8(e) are views showing relationships among bit information, signal waves and a modulated wave in one embodiment of the transfer method according to this invention.

FIGS. 8(a) to 8(e) are waveforms of a more specific embodiment of this invention. With reference to these waveforms the operation of the input/output stage of the IC card 200 of FIG. 3 will be explained. Here is assumed a case that, as shown in FIG. 8(a), a first bit information represented by five bits [00110] is transferred from the reader/writer device 100 to the IC card 100, and as shown in FIG. 8(e), a second bit information represented by five bits [01010] is transferred from the IC card 200 to the reader/writer device 100. In this case, the reader/writer device 100 only produces a first signal wave of FIG. 8(b). This first signal wave has trigger pulses at a set period T. The bit information of FIG. 8(a) is represented by the presence and absence of a bit pulse at a point at a set time interval t1+d from a time of the rise of its associated trigger pulse. That is, there are no bit pulses in the first and the second periods so that the bit information of [00]]is represented so that bit pulses are present in the third and the fourth periods, and the bit information of [11] is represented. Further, no bit pulse is present in the fifth period so that the bit information of [0] is represented. On the other hand, the IC card 200 only produces the second signal wave of FIG. 8(d). That is, no bit pulses are present in the first, the third and the fifth periods, and bit pulses rising at a time interval t2 from the rises of the associated trigger pulses are present in the second and the fourth periods. A modulated wave transmitted from the first coil 110 to the second coil 210 is a multiplexed signal wave of the first signal wave of FIG. 8(b) and the second signal wave of FIG. 8(d) which are superimposed on a carrier, and is shown in FIG. 8(c).

In the input/output stage of the IC card 200 of FIG. 3, the AM demodulating circuit 31 takes out the signal wave from the modulated wave of FIG. 8(c). The trigger pulse detecting circuit 32 detects from the signal wave trigger pulses appearing at the set period T to supply a first trigger signal to the received data demodulating circuit 33 at a time interval t1+d from its detection time of the trigger pulse and a second trigger signal to the transmitting data modulating circuit 34 at a time interval t2 from its detection time of the trigger pulse. The demodulation in the received data demodulating circuit 33 extracts the first bit information of FIG. 8(a) from the first signal wave of FIG. 8(b). That is, the received data demodulating circuit 33 detects a level of the signal wave when the first trigger signal is supplied by the trigger pulse detecting circuit 32, and when the signal wave is on level H, the circuit 33 outputs bit "1", and outputs bit "0" when the signal wave is on level L. A sequence of the thus outputted bits constitutes input data DI. By the use of such bit detecting method, even when the signal wave is rounded, bits can be accurately detected. The transmitting data modulating circuit 34 modulates the second bit information of FIG. 8(e) to generate a second signal wave of FIG. 8(d). That is, at the time when the second trigger signal is supplied by the trigger pulse detecting circuit 32, the transmitting data modulating circuit 34 generates bit information corresponding to a bit value of output data DO. To be more specific, when the output data DO indicates bit "1", one bit pulse is generated at the time of the second trigger signal is supplied, and when the output data DI indicates bit "0", no bit pulse is generated. Based on the thus generated second signal wave, the AM modulating circuit 35 changes an input impedance of the second coil 210. The input/output control circuit 36 commands the transmitting data modulating circuit 34 to transmit one bit when the received data demodulating circuit 33 has completed to receive one bit, thus to control transmitting and receiving operations. Thus concurrent two-way data transfer is enabled.

The data transfer method according to this invention has been described above by means of the shown embodiment. But this invention is not limited to the embodiment and covers other various modifications. In the above described embodiment, a single pulse is used as trigger pulses, but a plurality of pulses may be used as trigger pulses. In the above-described embodiment, the trigger pulses and the bit pulses have quite the same waveform, but it is possible to change a pulse width of the former from that of the latter. In the above described embodiment, two coils are used to transfer data, but more coils may be used. In the above-described embodiment, the trigger pulses are generated on the side of the reader/writer device 100 and are detected on the side of the IC card 200, but it is possible to oppositely generate the trigger pulses (by changing an input impedance of the coil) on the side of the IC card 200 and detect on the side of the reader/writer device 100. The above-described embodiment is an application of this invention to a data transfer system related to IC cards, but this invention is applicable not only to IG cards, but widely also to data transfer systems using semiconductor recording mediums.

Figure 9:
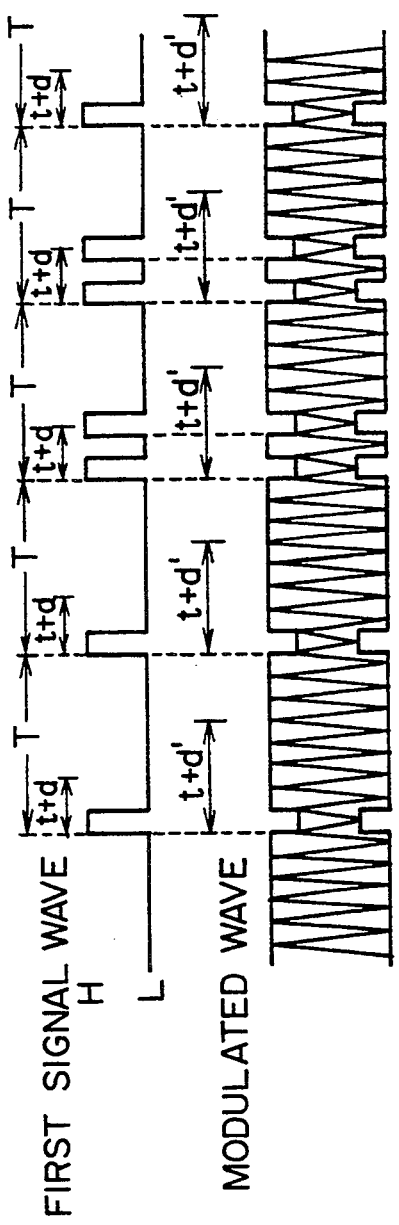
FIGS. 9(a) to 9(c) are views showing relationships among bit information, a signal wave and a modulated wave in another embodiment of the transfer method according to this invention.

As another method for detecting data bits in the received data demodulating circuit 33 a method is proposed in which pulses detected in a set time interval t+d' from the time of the detection of a trigger pulse are counted. When a pulse counted number is 1, it means that a trigger pulse alone is present, and bit "0" is detected. When a counted pulse number value is 2, both a trigger pulse and a bit pulse are present, and bit "1" is detected. That is, as shown in FIG. 9, one pulse is detected in a time interval t+d+, information "0" is represented, and when two pulses are detected, information "1" is represented.

As described above, according to the noncontact data transfer method of this invention, a signal wave is formed by trigger information provided at a set period T, a first bit information provided at a time interval t1 (t1<T) from the position of the trigger information, and a second bit information at a time interval t2 (t2<T) therefrom, whereby highly reliable and highly accurate data transfer can be conducted concurrently in two-ways.

Next, the resetting method of this invention will be explained below. As shown in FIG. 3, a reset unit 40, which conducts this resetting method, comprises an internal reset circuit 41, a pulse detecting circuit 42, a counter circuit 43 and an RS flip-flop 44. The internal reset circuit 41 outputs an internal reset signal $\overline{RES}$ when a source voltage VCC drops. This internal reset signal $\overline{RES}$ is for resetting the circuits of the input/output stage of the IC card 200 shown in FIG. 3. The pulse detecting circuit 42 detects a pulse from a signal wave demodulated by the AM demodulating circuit 31. This detected pulse is supplied to the counter circuit 43 and the set terminal S of the RS flip-flop 44. At this time, in the case that an external reset signal RST has been outputted, the reset is released as will be described later. The counter circuit 43 has the function of counting a number of clock pulses of the clock signal CLK supplied by the frequency divider 22 from a time when the pulse detecting circuit 42 has detected a pulse. When a counted value has reached a set number, the counter circuit 43 supplies a reset input to the reset terminal R of the flip-flop 44. Thus, an external reset signal RST is outputted from the RS flip-flop 44.

Figure 10:
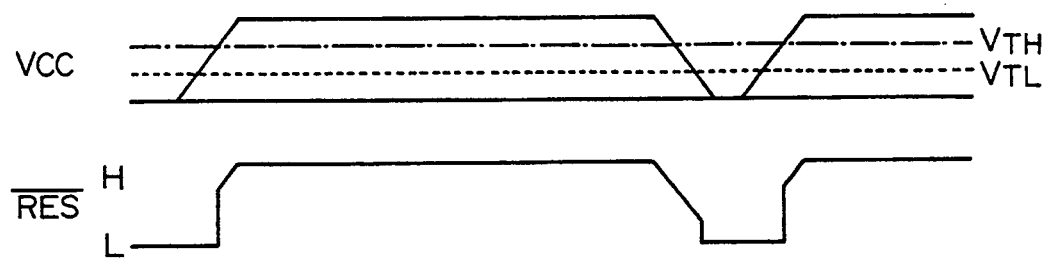
FIG. 10 is a waveform showing the generation of an interal reset signal $\overline{\text{RES}}$ involved in this invention.

The IC card 200 according to this embodiment has two kinds of reset signals. That is, one is the internal reset signal $\overline{\text{RES}}$ generated inside the IC card 200, and the other is the external reset signal RST generated in accordance with an external reset command. As shown in FIG. 3, the internal reset signal $\overline{\text{RES}}$ is generated by the internal reset circuit 41. The internal reset circuit 41 outputs an internal reset signal $\overline{\text{RES}}$ when a source voltage VCC from the regulator 13 has dropped. This output operation has a hysteresis as shown in the graphs of FIG. 10. That is, the source voltage VCC gradually rises, and at the time when the voltage has reached a first threshold value $V_{TH}$, the internal reset signal $\overline{\text{RES}}$ rises. The internal reset signal $\overline{\text{RES}}$ falls at the time when the source voltage VCC drops to a second threshold value $V_{TL}$. In short, the internal reset circuit 41 monitors a source voltage VCC supplied internally to the IC card 200, and when the voltage is normal, the circuit 41 retains the internal reset signal $\overline{\text{RES}}$ in "H" state, and retains the signal RES in "L" when the voltage is low.

Conventionally this reset signal RES is used to (externally) reset the IC card on the side of the reader/writer device 100. That is, when the reader/writer device 100 temporarily stops the transmission of a modulated wave, the power input unit 10 cannot supply a normal source voltage VCC. Resultantly the internal reset signal $\overline{\text{RES}}$ can be automatically outputted. But this method by which the source voltage supply is temporarily stopped and is resumed has a problem, as described above, that it takes time for the system to reach its stable state. The resetting method according to this invention uses the characteristic of the above-described innovational data transfer system so as to generate the external reset signal RST by a quite different method.

Figure 11:
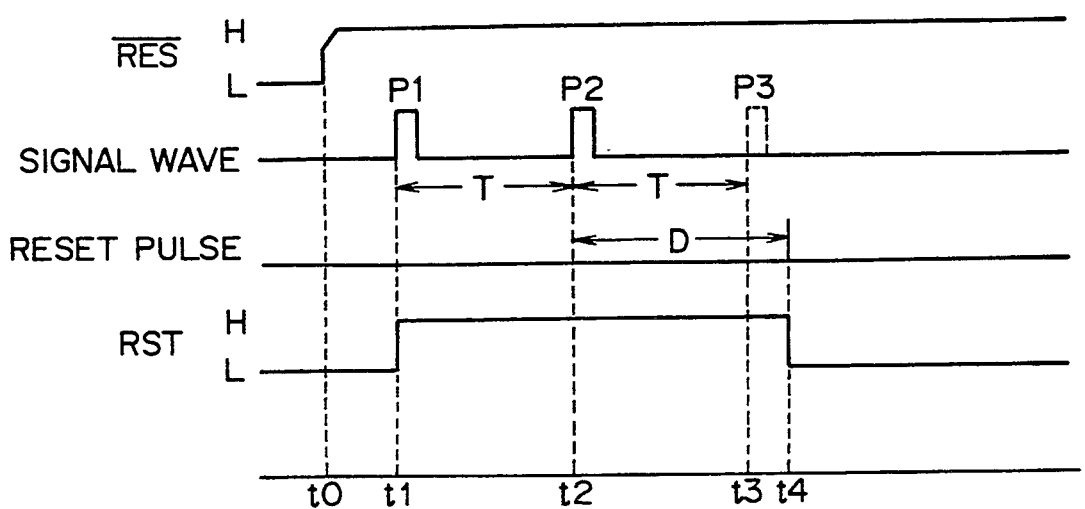
FIG. 11 is a waveform showing the generation of an external reset signal RST involved in this invention.
Figure 12:
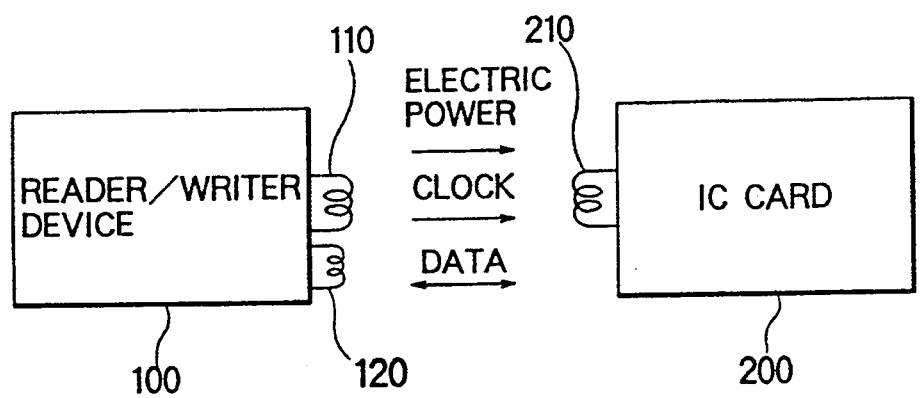
FIG. 12 is a block diagram of the reader/writer device 100 and the IC card 200 to which the noncontact data transfer method according to this invention is applied.

FIG. 11 is a time chart of the externally resetting method according to this invention. Here it is assumed that this data transfer system is actuated to thereby cause the internal reset signal $\overline{\text{RES}}$ to rise at a time t0. Soon the pulse detecting circuit 42, which functions to detect pulses of a signal wave demodulated by the AM demodulating circuit 31 as shown in FIG. 3, detects at a time t1 a trigger pulse P1 contained in the signal wave. The trigger pulse P1 detected by the pulse detecting circuit 42 is supplied to the counter circuit 43 and the RS flip-flop 44. The counter circuit 43 starts to count clock pulses of the clock signal CLK at the time t1 when this trigger pulse P1 rose. On the other hand, the RS flip-flop 44, which has been supplied with the trigger pulse P1 at the set input terminal S, begins to operate to cause a logic output Q. Thus, an external reset signal RST rises at the time t1. The external reset signal RST always retains "H" state at a time of data transfer, but its state changes to "L" when an external reset command is supplied from the reader/writer device 100.

The counter circuit 43 functions to supply a pulse signal to the reset input terminal R of the RS flip-flop 44 when a count value reaches a set value D (D>T). While the reader/writer device 100 is transferring data, trigger pulses appear at a period T in the signal wave. That is, a next trigger pulse P2 appears at a time t2. Accordingly the counter circuit 43 is supplied with another trigger pulse before it has counted up a set value D. At a time t2 the counter circuit 43 returns its counting value to an initial value zero, and starts anew a counting operation. On the other hand, at the time t2 a trigger pulse P2 is supplied to the set input terminal S of the RS flip-flop, so that the logic output Q, i.e., the external reset signal RST, is still retained in "H" state.

While data is being transferred by the medium of a signal wave, trigger pulses appear in the signal wave at a period T. Accordingly can be made an agreement that when a signal wave without any pulse is transmitted, a reset command is externally given. For example, an operation in which an expected trigger pulse P3 at a period T from the trigger pulse P2 is absent at a time t3 will be considered as shown in FIG. 11. In this case, even at the time t3, no pulse is inputted to the counter circuit 43, and accordingly the counter circuit 43 continues counting. And when a counted value of the counter circuit 43 reaches a set value D at a time t4, the reset pulse is outputted from the counter circuit 43 to the reset input terminal R of the RS flip-flop 44. Consequently the logic output Q of the RS flip-flop 44, i.e., an external reset signal RST is inverted to "L" state. This inverted state continues until a new pulse appears. At the time of appearance of the new pulse, the reset is released, and the external reset signal RST again returns to "H". In short, to reset the IC card 200 from the side of the reader/writer device 100, a process is taken that no pulse is provided in a signal wave during a set period of time D, and to release the reset a new pulse is provided in the signal wave thereafter. Since the transmission of the modulated wave is not interrupted, on the side of the IC card 200 the supply of the source voltage VCC and clock signal CLK are not interrupted. In the above-described embodiments, the relationships between the internal reset signal RES and the external reset signal RST has not been described, but it is preferable that when the internal reset is effected, the external reset as well is concurrently effected.

The resetting method according to this invention has been described by means of a shown embodiment. The resetting method is not limited to the embodiment and can be practicable in other various embodiments. For example the reset unit 40 in FIG. 3 is one example, and the same function may be done by other circuits. For example, in the above-described embodiment, the pulse detecting circuit 42 and the trigger pulse detecting circuit 32 are separate circuits, but since both have the same function, actually it is preferable that they share a single circuit. In this embodiment, this resetting method is applied to the data transfer system involving an IC card, but this resetting method is applicable not only to IC cards, but also other data transfer systems using semiconductor data recording mediums.

Thus, according to the method for resetting semiconductor data recording mediums of this invention, an external reset command can be recognized based on the presence and absence of pulses in a signal wave. Accordingly the semiconductor data recording mediums can be reset without the necessity of special reset lines and without interrupting the supply of source power.

Finally embodiments of the coil arrangement, which are suitable to the data transfer method according to this invention will be explained. In the embodiment of FIG. 1, the coil 110 is provided in the reader/writer device 100, and the coil 210 is provided in the IC card 200, whereby two-way data transfer is conducted by means of the two coils. In this embodiment, as shown in FIG. 2, a first coil 110 for transmitting data and a second coil 120 for receiving data are provided on the reader/writer device 100, and a third coil 210 for transmitting/receiving data is provided on the IC card 200. The second coil 120 has higher receiving sensitivity than the first coil 110. When the reader/writer device 100 and the IC card 200 are in their data transferring state, the first coil 110 and the third coil 210 are electromagnetically coupled to each other, and similarly the second coil 120 and the third coil 210 are electromagnetically coupled to each other. Through these electromagnetic coupling channels data transfer is conducted between the two. To be more specific, an electric power and clock are supplied from the reader/writer device 100 to the IC card 200, and data signals are transmitted and received in two-ways between the two.

The reader/writer device 100 superimposes on a carrier of a set frequency a first signal wave containing information represented by data to be transferred to produce a modulated wave, and supplies this modulated wave to the first coil 110 to transmit the data. On the other hand, the IC card 200 receives the transmitted modulated wave by the third coil 210, rectifies the received modulated wave to generate a source power, extract a component of a set frequency from the received modulated wave to generate clock signal, and demodulates the received modulated wave to detect the signal wave. Oppositely data alone is transmitted from the IC card 200 to the reader/writer device 100. To this end similarly with the above-described embodiment, an input impedance of the third coil 210 is changed. For example, a resistance value of a resistor element connected to the third coil 210 is switched, whereby a load applied to a current flowing through the first coil 110 and the second coil 120, which are electromagnetically coupled to the third coil 210, is changed. Accordingly a load change of the third coil. 210 of the IC card 200 can be detected by the first coil 110 and also by the Second coil 120. But it is preferred to use the second coil 120 to detect a load change because the coil 120 has high receiving sensitivity. Thus, the IC card 200 causes a load change in the third coil 210, based on a second signal wave containing information represented by data to be transferred, whereby on the side of the reader/writer device 100 the second coil 120 detects the second signal wave.

As described above, it is possible to detect a load change of the third coil 210 by the first coil 110. Accordingly the two-way data transfer is principally possible without the use of the second coil 210 as in the embodiment of FIG. 1. But since the first coil 110 is supplied with the modulated wave of FIG. 2(c), the load change component is entrained on the modulated wave. Generally the load change component (the second signal wave) is so feeble in comparison with the first signal wave of FIG. 2(b) that the effective detection of the component cannot be expected. A characteristic of this embodiment is that the second receiving coil 120 is provided for the detection of the load change component. The second coil 120 does not have to transmit a modulated wave and can effectively detect load changes because of its higher receiving sensitivity than the first coil 110.

Figure 13:
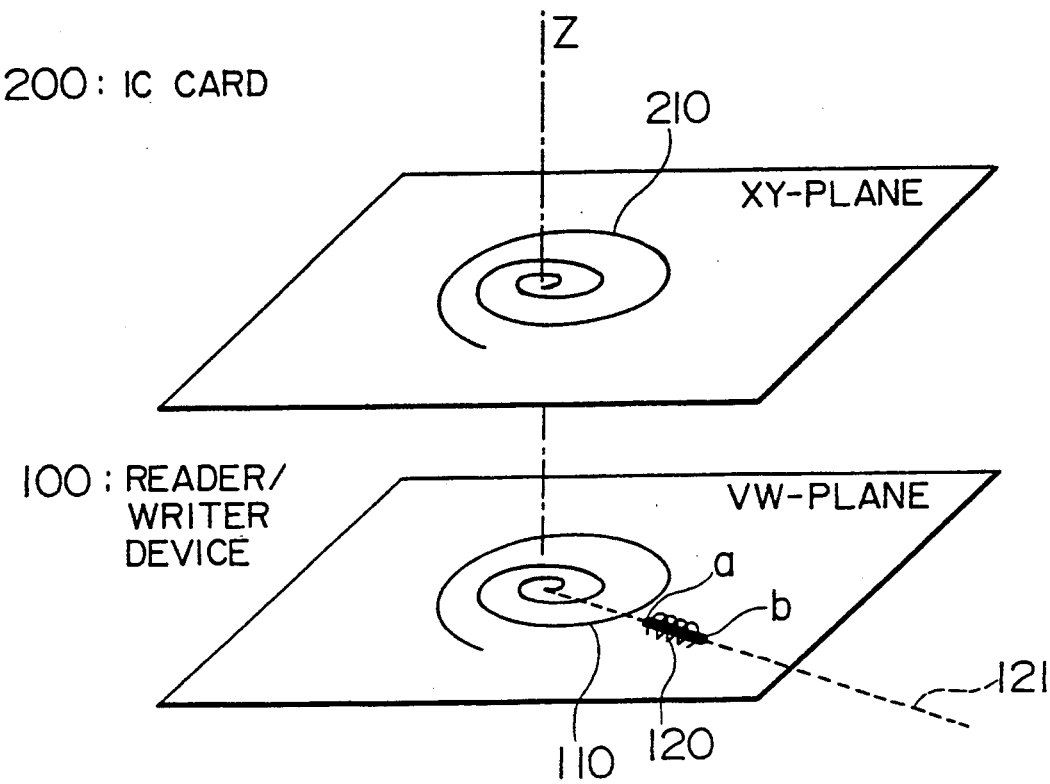
FIG. 13 is a view of an example of arrangements of three coils used in the noncontact data transfer method according to this invention.

Next, an embodiment of the above-described three coils, which exemplifies their shapes and is shown in FIG. 13. FIG. 13 shows a positional relationship among the three coils in which the reader/writer device 100 and the IC card 200 are their operative state for the data transfer. Here, as shown in FIG. 13, a parallel plane XY with the surfaces of the IC card 200 is defined inside the IC card 200, and a plane VW parallel with the plane XY is defined inside the reader/writer device 100. In this embodiment, the coil 110 of the reader/writer device 100 is provided by a spiral coil formed in the plane VW, and the third coil 210 of the IC card 200 is provided by a spiral coil formed in the plane XY. Both coils 110, 210 are formed in spirals formed around the central axis Z which is vertical to the respective planes. These spiral coils can be easily produced by printing conductor layers on print substrates. The second coil 120 of the reader/writer device is a conductor coiled on the coil central axis 121 included in the plane VW. A rod of ferrite is provided at the position of the coil central axis 121.

The above-described arrangement of the coils of these structures enables very efficient data transfer. The first coil 110 and the third coil 210 are spiral and parallelly opposed to each other. Accordingly a modulated wave produced in the first coil 110 is efficiently transmitted to the third coil 210. Their flat spiral structures are optimum for the coils to be built in the IC card 200 which has to be in a shape of thin cards. It is ideal that the second coil 120 is disposed at the most suitable position to detect a load change generated in the third coil 210. The inventor of this invention has experimentally found that the coil central axis 121 is preferably directed to the center of the first coil 110, and it is preferred that one end (a) of the second coil 120 is positioned near the outer periphery of the first coil 110. Preferably the end (a) is positioned in the plane VW so as to be near the coil 110, but an end (b) thereof may be out of the plane VW. Thus the provision of a transmitting coil and a receiving coil on the reader/writer device, and of a transmitting-/receiving coil on the semiconductor data recording medium enable efficient information transmission in two-ways through the coils.

The structures and arrangement of the coils of FIG. 13 is an example, and they are not limited to the example. The second coil 120 may be replaced by a magnetic detection device, e.g., a Hall device, which does the equivalent function to the coil 120.

What is claimed is:

1. A noncontact communication method between a semiconductor data recording medium and an reader/-writer device for writing and reading data to and from the semiconductor data recording medium; said reader/writer device superimposing a signal wave on a carrier to generate a modulated wave and transmitting the modulated wave by a transmitting coil; said semiconductor data recording medium receiving the modulated wave by receiving coil, and demodulating the received modulated wave to detect the signal wave; the semiconductor data recording medium comprising a processing unit, an electric power and a clock signal generated from said modulated wave and supplied to the processing unit and having data transfer being conducted with the semiconductor data recording medium and the reader/writer device kept out of physical contact with each other; the method comprising:

generating the signal wave comprising trigger information and first bit information being data to be transferred from the reader/writer device to the semiconductor data recording medium, the trigger information being represented by periodic trigger pulses with a predetermined period T and the first bit information being represented by a presence and an absence of bit pulses located behind the trigger pulses by a set time interval t1 (t1<T);

the semiconductor data recording medium recognizing the first bit information from the detected signal wave;

the semiconductor data recording medium changing an input impedance of the receiving coil to generate second bit information, the second bit information being data to be transferred from the semiconductor data recording medium to the reader/writer device, said second bit information being represented by a presence or an absence of bit pulses located behind the trigger pulses by a set time interval t2 (t2<T);

the reader/writer device detecting changes in the input impedance of the receiving coil by deformation of said modulated wave for recognizing the second bit information; and generating a reset signal for the processing unit to be transferred from the reader/writer device to the semiconductor data recording medium by omitting said trigger pulses for a predetermined period of time.

2. A noncontact communication method as set forth in claim 1,
wherein the processing unit is reset when a predetermined period of time D (D>T) has passed from a time when the semiconductor data recording medium detects a last trigger pulse.

3. A noncontact communication method as set forth in claim 2,
wherein a reset condition of the processing unit is released when the semiconductor data recording medium detects a new trigger pulse.

4. A noncontact communication method as set forth in claim 1,
further comprising the step of providing a sensitive coil on the reader/writer device to detect changes in the input impedance of the receiving coil, said sensitive coil having a higher sensitivity than that of the transmitting coil, and the second bit information being recognized by using said sensitive coil.

5. A noncontact communication method as set forth in claim 4, further comprising the step of providing the transmitting coil by a spiral coil formed in a first plane, the receiving coil by a spiral coil formed in a second plane parallel with the first plane, and the sensitive coil by a coil having one end positioned on an outer periphery of the transmitting coil.

* * * * *